United States Patent Office 3,023,085
Patented Feb. 27, 1962

3,023,085
METHOD OF COMBINING HYDROGEN
AND OXYGEN
John P. McBride, Oak Ridge, Tenn., assignor to the United States of America as represented by the United States Atomic Energy Commission
No Drawing. Filed Mar. 30, 1960, Ser. No. 18,786
7 Claims. (Cl. 23—204)

My invention relates to a catalyst for combining hydrogen and oxygen in thorium oxide slurries.

Thorium oxide slurries are useful in thermal breeder neutronic reactors, the thorium in the slurry being converted to fissionable uranium 233 as a result of thermal neutron irradiation. In one type reactor a heavy-water fuel solution containing uranyl sulfate enriched in fissionable uranium is circulated through a central core and a heavy water slurry containing a high concentration, e.g., 500 to 1500 grams per liter, of thorium oxide is circulated through a blanket surrounding the core. Thorium oxide may also be employed in combination with uranium oxide in a heavy-water slurry which is circulated through a single vessel, with the slurry thus containing both fuel and fertile material. Further information regarding the use of thorium oxide slurries in nuclear reactors may be seen by reference to pages 128-189 of "Fluid Fuel Reactors" by J. H. Lane, H. G. McPherson and Frank Maslan, this book having been presented at the Second International Conference on the Peaceful Uses of Atomic Energy, Geneva, Switzerland (1958).

One of the problems encountered in the use of aqueous solutions and slurries in neutronic reactors is the radiation-induced decomposition of water. Upon being subjected to ionizing radiation water decomposes to form gaseous hydrogen and/or deuterium and oxygen, and the presence of these gases results in serious operation difficulties. If the gases are allowed to accumulate an explosion hazard is presented. In addition, bubbling of these gases may create a serious reactor control problem and result in erratic operation. Recombination of these gases is thus essential, particularly for reactors operating at high power levels.

Various catalysts have been employed to combine hydrogen and oxygen in thorium oxide slurries, but none has proved entirely satisfactory. Molybdenum trioxide has shown high catalytic activity for thorium oxide slurries containing thorium oxide calcined at extremely high temperatures, e.g., 1200 to 1600° C. The activity of this catalyst, however, is relatively low for thorium oxide calcined at lower temperatures and is decreased at low catalyst concentrations by the presence of uranium oxide. Palladium has also been used as a catalyst, but the activity of palladium as prepared by the methods previously used has been undesirably low.

The relative activity of catalysts in combining hydrogen and oxygen in thorium oxide slurries may be conveniently expressed in two ways: by the reaction rate in moles of hydrogen consumed per liter per hour at a given temperature and a given hydrogen partial pressure and by a catalyst preformance index which is equal to the power density in watts per milliliter that can be supported by a given catalytic system at given steady-state hydrogen partial pressure. The catalyst performance index, to be referred to hereinafter as CPI, is obtained by dividing the reaction rate as defined above by a factor of 0.38 times the G value for gas production, which is taken as 0.6. These factors are derived from calculations of the amount of radiolytic gas produced during reactor operation. A steady-state hydrogen partial pressure of 100 pounds per square inch is employed in these determinations since this corresponds to a radiolytic gas pressure which is safely below an explosive concentration at the operating temperatures desired, e.g., 280° C.

Palladium catalysts as prepared by previously used methods have shown varying degrees of activity, ranging from CPI values of 1 to 80 watts per milliliter per millimole of palladium at 100 p.s.i. hydrogen partial pressure. In one method palladium is reduced with hydrogen onto dispersed thorium oxide suspended in an acetone-alcohol solution of palladium nitrate with a low concentration of palladium, e.g., 0.026 gram per gram of thorium oxide and the resulting solid is recovered and dried. The catalyst prepared by this method has shown consistently low activity (1 to 5 watts per milliliter per millimole of palladium). Improved activity, i.e., up to 80 watts per milliliter per millimole, has been obtained by reducing palladium onto high-temperature-calcined (1600° C.) thorium oxide in an aqueous dispersion, with a palladium concentration below 250 parts per million based on thorium being employed. Since any amount of added catalyst lowers the neutron economy of the reactor to some extent by absorbing neutrons, it is desired to employ a minimum amount of catalyst. An additional increase in catalytic activity would increase reactor efficiency by providing adequate recombination with a smaller amount of catalyst.

It is, therefore, an object of my invention to provide an improved palladium catalyst.

Another object is to provide an efficient catalyst for combining hydrogen and oxygen in aqueous thorium oxide slurries.

Another object is to provide a catalyst for combining hydrogen and oxygen in an aqueous slurry containing thorium oxide and uranium oxide.

Another object is to provide a method of preparing a palladium catalyst for combining hydrogen and oxygen in aqueous thorium oxide slurries.

Other objects and advantages of my invention will be apparent from the following detailed description and claims appended hereto.

In accordance with my invention an improved palladium catalyst for combining hydrogen and oxygen in aqueous thorium oxide slurries is prepared by providing a thorium oxide sol in an aqueous medium containing palladium nitrate at a concentration of at least 0.05 gram per gram of thorium oxide, contacting the resulting sol with gaseous hydrogen until said sol is converted to a flocculated suspension and recovering the resulting suspended solids. The recovered solids may then be added to a thorium oxide slurry to provide the desired palladium concentration. Greatly improved catalytic activity is obtained by this method, and the amount of palladium required in a slurry to provide recombination at a rate sufficient to allow operation at a given power level is substantially decreased, thus resulting in better neutron economy.

It is to be understood that this invention is equally applicable to the combination of oxygen with both ordinary hydrogen and deuterium. Accordingly, as used in this specification and in the appended claims, the term "hydrogen" refers to both ordinary hydrogen and deuterium and to any combination of the two isotopes. In the preparation of a catalyst for use in a heavy water slurry it is preferred to employ heavy water as the preparation medium in order to avoid isotopic dilution of the heavy water in the slurry with light water.

Although my invention is not to be understood as limited to a particular theory, it is postulated that the improved catalytic activity results from higher fractional surface coverage of the thorium oxide by the palladium. The highly active, palladium-covered thorium oxide particles serve to catalyze the hydrogen and oxygen in the slurry without being effected by the properties of the other oxide particles which comprise the bulk of the slurry.

Although the method of forming the thorium oxide sol is not critical to my invention, it is preferred to reflux thorium oxide prepared by calcination of thorium oxalate at a temperature not exceeding 650° C. in an aqueous palladium nitrate solution. Thorium oxide particles prepared by low-temperature calcination of thorium oxalate comprise a lattice of extremely small crystallites, and the lattice is destroyed under these conditions to provide individual crystallites small enough, i.e., approximately 100 angstroms in diameter, to form a sol. Thorium oxide prepared by calcination at higher temperatures does not degrade sufficiently in a palladium nitrate system to provide a sol, and the larger particles which are obtained, i.e., over 0.1 micron, form a dispersion and eventually settle. The formation of a sol in a thorium oxide-palladium nitrate system is evidenced by the change from an initial yellow opaque suspension to a brown translucent mass exhibiting colloidal properties. Refluxing for approximately one hour is required to form a sol with this system. Any of the previously known methods of forming a thorium oxide sol such as by heating thorium oxide in a nitric acid solution may also be employed, with the palladium nitrate being added subsequently.

A palladium nitrate concentration of at least approximately 0.05 gram per gram of thorium oxide in the sol is required to prepare the catalyst. It is postulated that a significantly higher catalytic activity would not result from using higher concentrations of palladium; consequently, the minimum effective amount is preferred. This amount of palladium also is sufficient in forming the sol by refluxing thorium oxide prepared by low-temperature calcination of thorium oxalate in a palladium nitrate solution. The concentration of thorium oxide in the sol is not critical, and any convenient concentration such as 100 to 200 grams per liter may be employed.

The thorium oxide particles in the sol are coated with palladium by contacting the palladium-containing sol with gaseous hydrogen. In this step palladium is reduced and a flocculated suspension is formed. This reaction may be conveniently effected by bubbling hydrogen gas into the sol. Although the temperature is not critical, it is preferred to maintain the sol at a temperature within the range of 50° C. to 90° C. in order to obtain a more rapid reaction. The bulk of the nitrate ion is destroyed during the reduction reaction, the nitrate ions being converted to other nitrogen-containing chemical species and partially removed in the evolved gases.

The flocculated suspension thus obtained may be added directly to a thorium oxide slurry to provide the amount of catalyst desired. A final concentration within the range 100 to 1000 parts per million of palladium based on thorium provides adequate gas recombination for reactor slurries, with the exact amount of catalyst being varied, depending on the power level desired. The catalyst may also be employed in this manner in thorium oxide slurries containing uranium oxide, since the activity of the catalyst is not decreased by the presence of uranium oxide.

The catalyst prepared by the method of my invention is applicable generally to combining hydrogen and oxygen in thorium oxide slurries under a variety of conditions. This catalyst is effective for slurry systems in which hydrogen and oxygen are present in a stoichiometric mixture, i.e., 2 moles hydrogen per mole of oxygen, and for mixtures containing either excess hydrogen or excess oxygen. An excess oxygen atmosphere, e.g., 100 to 200 p.s.i.a. at 280° C., may be employed in slurry systems to lessen corrosion to the reactor. Catalytic activity is decreased under excess oxygen when compared to that under excess hydrogen, but the reaction rate is still sufficient to provide adequate recombination. The temperature of the system is not critical to the effectiveness of this catalyst. Although my invention is not to be understood as so limited, a rapid gas combination rate is obtained within the 250° C. to 300° C. temperature range employed in nuclear reactor slurry blankets.

The palladium catalyst prepared by the method of my invention is not limited in its application to the combination of hydrogen and oxygen but may also be employed in other catalytic processes in which palladium is used such as hydrogenation and dehydrogenation of organic compounds and in the preparation of vitamins, vitamin adjuncts and certain antibiotics.

My invention is further illustrated by the following specific example.

EXAMPLE I

Palladium catalysts were prepared by a previously used dispersion method and by the method of my invention in order to compare their catalytic activity. In the dispersion method thorium oxide which had been prepared by calcining thorium oxalate at a temperature of 1600° C. was refluxed in an aqueous palladium nitrate solution containing 230 parts per million based on thorium to form an aqueous dispersion. Gaseous hydrogen was then bubbled through the dispersion to reduce the palladium onto the dispersed thorium oxide. The resulting solids were recovered from solution and calcined at a temperature of 800° C. An aqueous slurry was prepared from the calcined solids to contain 100 grams thorium per kilogram of water, and the slurry was heated overnight at 280° C. in the presence of oxygen (300 p.s.i.a. at 25° C.). A slurry catalyst was then prepared by the method of my invention in the following procedure: Thorium oxide which had been prepared by calcination of thorium oxalate at a temperature of 650° C. was combined with palladium nitrate in an aqueous system to provide a concentration of 0.05 gram palladium nitrate per gram of thorium oxide. The resulting mixture was then refluxed for one hour to form a sol. Gaseous hydrogen was then bubbled through the sol to form a flocculated suspension. The suspension was added directly to an aqueous slurry of thorium oxide prepared by calcination of thorium oxalate at 1600° C. to provide a slurry containing 100 grams of thorium per kilogram of water and 275 parts per million of palladium based on thorium. The slurry was heated overnight at 280° C. under an oxygen overpressure (300 p.s.i.a. at 25° C.).

The palladium-containing slurries prepared by the two methods described above were tested for catalytic activity in a series of gas combination experiments conducted in the following manner: Ten milliliters of slurry was added to a 20 ml. stainless steel bomb. The slurry was then heated 16 to 20 hours at 280° C. under an oxygen atmosphere (200 to 300 p.s.i.a. at room temperature). Oxygen and hydrogen gases were added to the bomb at 280° C. in varying ratios, with the oxygen being added first to preserve the oxidized condition of the slurry. The decrease in pressure in the bomb was measured by means of a water-filled capillary connected to the bomb and a pressure cell, which in turn actuated a recorder. The moles of radiolytic gas, $n$, removed from the system per liter of slurry per unit time, $t$, were calculated from the equation $$\frac{\Delta n}{\Delta t} = K\pi \cdot \frac{PVg}{RT} \cdot \frac{1000}{Vs}$$

where $Vg$ and $Vs$ are the volumes of gas and slurry, respectively, in cubic centimeters, $P$ is the partial pressure of the radiolytic gas, $R$ is the gas constant in appropriate units, $T$ is the absolute temperature and $K\pi$ is a reaction rate constant equal to the slope of a plot of the decrease in pressure per unit time versus the average pressure during the interval, perfect gas behavior and first order dependence on radiolytic gas partial pressure being assumed. The reaction rate in moles of hydrogen per liter of slurry per hour was calculated from the above equation and the CPI index value was calculated by dividing the reaction rate by 0.38 times the G value for gas production, 0.6. The results obtained may be seen by reference to the following table.

Table I

REACTION OF $H_2$–$O_2$ MIXTURES IN AQUEOUS THORIUM OXIDE SLURRIES CONTAINING PALLADIUM CATALYST 100 g. Th/kg. $H_2O$—1600° C. $ThO_2$
Slurry pretreated with $O_2$ at 280° C. for 16 hr.
Reaction temperature of 280° C.

DISPERSION PREPARATION METHOD: (230 p.p.m. Pd/Th)

| $H_2/O_2$ ratio | Reaction rate $P_{H_2}=100$ p.s.i. (moles $H_2$/liter/hr.) | Catalyst performance index (watts/ml.)/100 p.s.i. $H_2$ | |
|---|---|---|---|
| | | Based on weight of Pd given | Based on 1 milli-molal Pd |
| 2.3 | 1.8 | 8.1 | 37 |
| 2.1 | 3.9 | 17.1 | 79 |
| 1.9 | 4.0 | 17.5 | 81 |
| 1.8 | 1.3 | 5.8 | 27 |

SOL PREPARATION METHOD: (275 p.p.m. Pd/Th)

| | | | |
|---|---|---|---|
| 0.53 | 19 | 83 | 320 |
| 0.66 | 26 | 114 | 440 |
| 0.79 | 22 | 97 | 380 |
| 0.84 | 27 | 118 | 460 |
| 1.07 | 32 | 140 | 540 |
| 1.23 | 27 | 118 | 460 |
| 1.28 | 21 | 92 | 360 |
| 1.38 | 25 | 110 | 430 |

It may be readily seen from the above table that the sol preparation method results in much higher catalytic activity, with CPI values being increased by a factor of 4 and more over the previously employed dispersion method.

The above example is not to be construed as limiting the scope of my invention, which is limited only as indicated in the appended claims. It is also to be understood that variations in apparatus and procedure may be employed without departing from the scope of my invention.

Having thus described my invention, I claim:

1. The method of recombining hydrogen and oxygen produced by subjection of a thorium oxide slurry to ionizing radiation in a pressurized system which comprises refluxing thorium oxide prepared by calcination of thorium oxalate at a temperature not exceeding approximately 650° C. in an aqueous medium containing palladium nitrate at a concentration of at least approximately 0.05 gram per gram of thorium oxide until the formation of a sol is completed, contacting the resulting sol with gaseous hydrogen until said sol is converted to a flocculated suspension and adding said flocculated suspension to said thorium oxide slurry.

2. The method of claim 1 in which the temperature of said thorium oxide slurry is within the range of approximately 250° C. to 300° C.

3. The method of claim 1 in which said pressurized system contains gaseous oxygen in excess of the stoichiometric amount required to combine with said hydrogen.

4. The method of claim 1 in which said pressurized system contains gaseous hydrogen in excess of the stoichiometric amount required to combine with said oxygen.

5. The method of combining hydrogen and oxygen produced by subjection of an aqueous thorium oxide slurry to ionizing radiation which comprises forming a thorium oxide sol in an aqueous medium containing palladium nitrate at a concentration of at least approximately 0.05 gram per gram of thorium oxide, contacting said sol with gaseous hydrogen until said sol is converted to a flocculated suspension and adding the resulting suspended solids to said thorium oxide slurry.

6. The method of claim 5 wherein said suspended solids are added to said thorium oxide slurry in an amount sufficient to provide a palladium concentration of 100 to 1000 parts per million parts of thorium in said thorium oxide slurry.

7. The method of claim 6 wherein said thorium oxide slurry contains a minor proportion of uranium oxide.

References Cited in the file of this patent

UNITED STATES PATENTS

| 2,857,337 | Hamilton et al. | Oct. 21, 1958 |
| 2,863,729 | McDuffie | Dec. 9, 1958 |
| 2,949,429 | Bailey et al. | Aug. 16, 1960 |
| 2,952,525 | Harteck | Sept. 13, 1960 |